United States Patent [19]
Stolen

[11] Patent Number: 5,880,866
[45] Date of Patent: Mar. 9, 1999

[54] TIME DIVISION DEMULTIPLEXING USING SELECTIVE RAMAN AMPLIFICATION

[75] Inventor: Rogers Hall Stolen, Rumson, N.J.

[73] Assignee: AT&T Corp, Middletown, N.J.

[21] Appl. No.: 748,328

[22] Filed: Nov. 13, 1996

[51] Int. Cl.[6] .................................................. H04J 14/08
[52] U.S. Cl. .......................... 359/138; 359/139; 359/158; 359/134; 359/123
[58] Field of Search ..................................... 359/123, 134, 359/135, 138, 139, 158, 189, 193

[56] References Cited

U.S. PATENT DOCUMENTS

| 3,705,992 | 12/1972 | Ippen et al. | 307/88.3 |
| 4,879,761 | 11/1989 | Webb | 359/158 |
| 5,357,359 | 10/1994 | Uchiyama et al. | 359/123 |

OTHER PUBLICATIONS

Morioka et al., "Ultrafast Optical Multi/Demultiplexer Utilising Optical Kerr Effect In Polarisation–Maintaining Single–Mode Fibers," *Elect. Lett.,* vol. 23, No. 9, Apr. 23, 1987, pp. 453–454.
Nelson et al., "All–Optical Gbit/s Switching Using Nonlinear Optical Loop Mirror," *Elect. Lett.,* vol. 27, No. 9, Apr. 25, 1991, pp. 704–705.
Krautschik et al., "Demonstration of Demultiplexing With a Rocking Filter Fiber," *Appl. Phys. Lett.,* vol. 63, No. 7, Aug. 16, 1993, pp. 860–862.
Duhr et al., "Ultrafast Kerr Demultiplexing up to 460 Gbits/s in Short Optical Fibers," *Applied Optics,* vol. 34, No. 24, Aug. 20, 1995, pp. 5297–5300.
Islam, *Ultrafast Fiber Switching Devices and Systems,* Cambridge University Press (1992), pp. 125–135.
Hedekvist et al., Demonstration of fibre four–wave mixing optical demultiplexing with 19dB parametric amplification, *Elect. Lett.,* Online No. 19960522, Feb. 16, 1996.

*Primary Examiner*—Leslie Pascal

[57] ABSTRACT

An optical transmission system utilizing a nonlinear fiber demultiplexer. A time division multiplexed optical signal is transmitted via a first optical signal path. An optical pump pulse is transmitted via a second optical signal path. The optical pump pulses are synchronized to correspond to the pulses in the multiplexed optical signal for which extraction is desired. The first and second optical signal paths are coupled such that the portions of the multiplexed signals which are synchronized with the optical pump pulses are amplified through Raman gain. The resulting signal is detected and passed through a threshold detector which filters out pulses below an intensity threshold. The desired demultiplexed signal, which was amplified by the pump pulses, passes through the optical threshold detector as an electronic pulse.

18 Claims, 3 Drawing Sheets

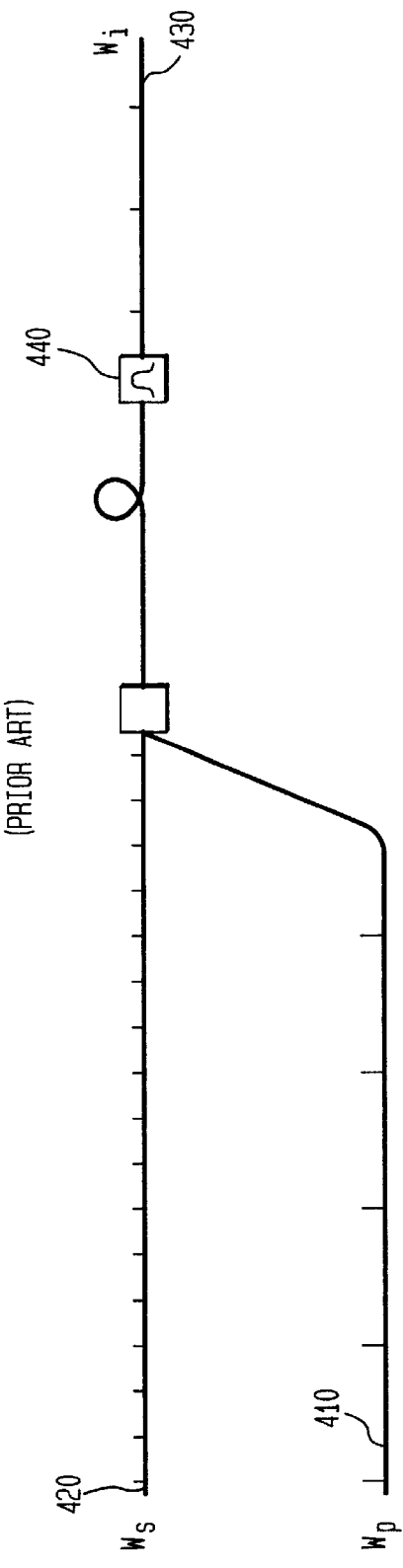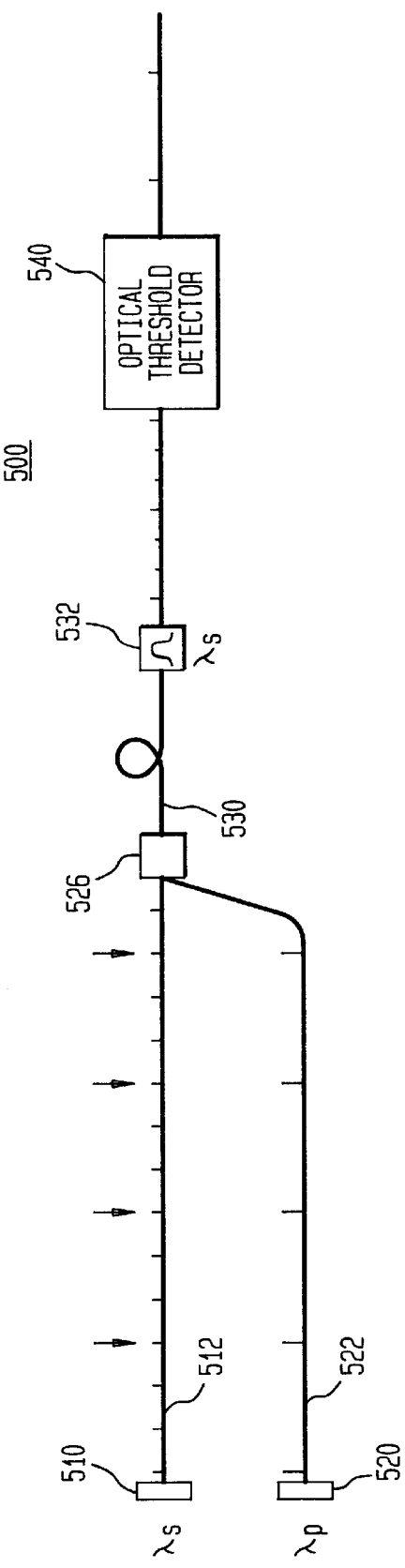

TIME DIVISION DEMULTIPLEXING USING SELECTIVE RAMAN AMPLIFICATION

FIELD OF THE INVENTION

The present invention relates generally to optical signal processing and more particularly to optical signal processing using time division demultiplexing.

BACKGROUND OF THE INVENTION

Digital transmission systems send signals as a series of ones and zeros. In an optical transmission system, such as a fiber optic transmission system, the ones and zeros are represented by the presence or absence of an optical pulse. A number of different digital signals can be combined together with each signal occupying its own time slot in a digital pulse stream of higher rate than of each individual signal. This is known as "time-division multiplexing" (TDM) and it allows the optical digital signals to timeshare the same transmission line, such as an optical fiber. As used herein, the term multiplexed means time division multiplexed. At the receiving end of the optical transmission system the multiplexed signals are separated out (demultiplexed) to extract the individual signals, and the individual signals may be processed accordingly. It is noted that multiplexed signals can in turn be multiplexed together to form a hierarchy of multiplexed digital signals. In such a case, the demultiplexing may take place in several stages.

In conventional system, a multiplexed optical signal is first detected by electronic components, such as photodetectors, to convert the string of optical pulses into electrical pulses which contain the multiplexed signal. The demultiplexing is then performed electronically on the resulting electrical signal. Current limitations in the speed of the electronics limits the pulse rate of high speed transmission systems to about 10 Gbit/s. Current research is being done with a view toward increasing this speed to 20 Gbit/s. However, future optical transmission systems envision rates of 100 Gbit/s or higher which would be accomplished by wavelength division multiplexing or time division multiplexing.

A problem results in that demultiplexing an optical signal of 100 Gbit/s or greater clearly exceeds the limitations set by the speed of the detection electronics. As a result, techniques for performing the demultiplexing step optically, before the optical signal is converted into an electronic signal, have been investigated.

The techniques for optical demultiplexing typically involve nonlinear optical processes. A nonlinear optical demultiplexer generally requires: 1) a sequence of short optical pulses which are transmitted at the rate of the pulse sequence to be extracted from the multiplexed optical signal; 2) a means for synchronizing the series of pulses with the pulse sequence to be demultiplexed; and 3) a nonlinear medium which is usually an optical fiber but could also be a semiconductor amplifier. For further information on nonlinear devices see, M. N. Islam, *Ultrafast Fiber Switching Devices and Systems*, Cambridge Univ. Press (1992), which is incorporated herein by reference.

The fiber nonlinear optical devices which have been used or proposed for optical time-division demultiplexing are all based on the nonlinear refractive index of the optical signal path which is the small increase in the index of refraction with optical power. These devices are described below.

1. Kerr Effect Devices.

A Kerr effect device uses the nonlinear index to change the state of polarization out of a fiber. In a Kerr demultiplexer (shown in FIG. 1) a strong optical pulse which functions as a demultiplexing control pulse is transmitted over optical signal path 100 at wavelength $\lambda_p$. A weaker multiplexed signal is transmitted over optical signal path 120 at wavelength $\lambda_s$. The signals are combined by wavelength multiplexing coupler 110. For the portions of the multiplexed signal which are synchronized with the control pulse, birefringence from the control pulse changes the polarization of the weaker multiplexed signal transmitted in optical signal path 115. Bandpass filter 120 is used to filter out the optical pulse signal at wavelength$\lambda_p$ to allow only the demultiplexed signal at wavelength $\lambda_s$ to pass through to signal path 122. A polarizer 130 is provided so an output pulse on optical signal path 140 appears only when the desired multiplexed signal pulses are present. Polarization controllers (PC) 150, 152, 154 are required to ensure proper orientation of the states of polarization of the signal on optical signal path 120, the strong pulse on optical signal path 100, and the signal on optical signal path 122. About 1 kW peak power in 1 m of fiber (or 1 W in 1 km) is necessary to operate a Kerr device. For further information on Kerr effect multiplexing see, T. Morioka, M. Saruwatari, and H. Takara, *Ultrafast Optical Multi/Demultiplexer Utilizing Optical Kerr Effect in Polarization-Maintaining Single-Mode Fibres*, Electronics Letters Vol. 23, No. 9, pages 453–454, Apr. 23, 1987; and O. Dühr, Frank Seifert, and Valentin Petrov, *Ultrafast Kerr Demultiplexing up to 460 Gbits/s in Short Optical Fibers,* Applied Optics, Vol. 34, No. 24, Aug. 20, 1995, both of which are incorporated herein by reference.

2. Nonlinear directional coupler.

The basic nonlinear directional coupler (shown in FIG. 2) is a twin-core fiber or parallel planar guides. An intensity-dependent change in refractive index blocks the normal power exchange between the guides so the coupler 220 becomes an intensity-dependent optical switch. For demultiplexing, a length is chosen so that the multiplexed optical signal on path 200 appears on the optical signal path 200 after the coupler 220 only when the demultiplexing pulse is present on optical signal path 210. Beat lengths are short (1 meter would be long for a twin-core fiber) so the nonlinear coupler is a high power device. The power-length product is about the same as for a Kerr device. A nonlinear coupler many beat periods long is similar to a Kerr device. It also suffers similar requirements for active stabilization because of sensitivity to temperature and pressure fluctuations.

The basic principal of the nonlinear directional coupler is that some sort of coupling or transfer of light is blocked by an optical beam intense enough to change the refractive index. There is a family of such devices which appear to be quite different from the twin-core directional coupler but are similar both in function and optical power requirements. These devices are made with a two-mode fiber, a birefringent fiber, or a so-called 'rocking filter fiber'. Mode beating in a two-mode fiber is just one limit of coupling in a twin-core fiber. In a birefringent fiber the sign of circular polarization reverses at half the birefringence beat length. High power changes the properties of the fiber and the input polarization propagates unchanged. A rocking filter coupler uses linear rather than circular polarizations in a birefringent fiber with periodic polarization coupling matched to the beat length. High optical power shifts the coupling wavelength. For further information on a rocking filter coupler see, C. G. Krautschik, P. Wigley, G. I. Stegeman, and R. H. Stolen, *Demonstration of demultiplexing with a Rocking Filter Fiber,* Appl. Phys. Lett., Vol. 63, No. 7, Aug. 16, 1993, pages 860–862, which is incorporated herein by reference.

3. Nonlinear Loop Mirror.

A fiber Mach-Zender interferometer is, in principle, a simple way to make a demultiplexer. Demultiplexing high-power pulses in one arm of the interferometer change the relative phase of the two signal paths meeting at the output coupler but it is difficult to achieve temperature stability in two long separate fibers. A nonlinear interferometer that does not require stabilization is a loop mirror made with a 3 dB fiber coupler and a loop of fiber as illustrated in FIG. 3. The loop mirror 310 is a perfect reflector and transmits nothing from its output port 340. A loop mirror is stable to environmental changes because the two arms of the interferometer are clockwise and counterclockwise paths in the same fiber so a very long fiber can be used. Demultiplexing pulses transmitted over optical signal path 320 copropagate with the signal pulses transmitted over optical signal path 330 in only one direction. By way of the nonlinear index, clockwise and counterclockwise signals experience a relative phase shift and signal power will be transmitted from the output port 340. Demultiplexing with 150 mW pulses was demonstrated in a 5 km loop in, B. P. Nelson, K. J. Blow, P. D. Constantine, N. J. Doran, J. K. Lucek, I. W. Marshall, K. Smith, *All Optical Gbit/s Switching Using Nonlinear Optical Loop Mirror*, Electronics Letters, Vol. 27, No. 9, Apr. 25, 1991, which is incorporated herein by reference. Nonlinear loop mirrors do require polarization control to ensure the proper state of polarization at the fiber coupler. Active stabilization is necessary because the state of polarization can vary with changes in temperature and pressure.

4. Four-wave mixing.

A four-wave mixing demultiplexer (shown in FIG. 4) utilizes mixing of waves through the nonlinear index. A pump signal transmitted over optical signal path 410 at frequency $\omega_p$ and a weaker multiplexed signal transmitted over optical signal path 420 at frequency $\omega_s$ generate an idler on signal path 430 at frequency $\omega_i = 2\omega_p - \omega_s$. The demultiplexed pulse stream transmitted over optical signal path 430 at frequency $\omega_i$ is isolated with a bandpass filter 440. If the pump wavelength is close to the zero-dispersion wavelength, the coherence length for four-wave mixing becomes extremely long. With 100 mW of pump power, 10 km of fiber, and wavelength separations 10 nm or less conversion efficiency from input signal could be 20 dB. For further information on four-wave mixing demultiplexers see, P. O. Hedekvist and P. A. Andrekson, *Demonstration of Fibre Four-Wave Mixing Optical Demultiplexing with 19 dB Parametric Amplification,* Electronics Letters, Vol. 32, No. 9, pages 830–831, Apr. 25, 1996, which is incorporated herein by reference.

All of these nonlinear fiber demultiplexers suffer from the choice between short fibers requiring high optical powers or long fibers with polarization control and some sort of active stabilization. As a general rule, the power-length product for all these nonlinear index devices is about 1 kW-m using standard fiber. Thus, a nonlinear fiber demultiplexer which would circumvent the tradeoff between length and stability is desirable.

SUMMARY OF THE INVENTION

The present invention provides a method and apparatus for optical signal processing using time division multiplexing. Demultiplexing is performed on the optical signal such that high data rates can be accommodated.

In accordance with one aspect of the invention, an optical transmission system transmits a multiplexed optical signal over a first optical signal path. Synchronized optical pump pulses are transmitted over a second optical signal path. The optical pump pulses are synchronized to the pulses in the multiplexed signal for which extraction is desired. The first and second optical signal paths are coupled such that the portions of the multiplexed optical signal which are synchronized with the optical pump pulses are amplified through Raman gain. The resulting signal is provided to an optical threshold detector which is configured to pass only signals which are above a certain intensity threshold. As a result, only the desired pulses from the multiplexed signal, which were amplified by the pump pulses, are detected and passed through the optical threshold detector resulting in the demultiplexing of the desired signal.

These and other advantages of the invention will be apparent to those of ordinary skill in the art by reference to the following detailed description and the accompanying drawings.

BRIEF DESCRIPTION OF THE DRAWINGS

FIG. 4 illustrates a prior art optical transmission system utilizing a four-wave mixing demultiplexer.

FIG. 5 illustrates an optical transmission system utilizing a Raman gain demultiplexer in accordance with the present invention.

DETAILED DESCRIPTION

Figure 1:
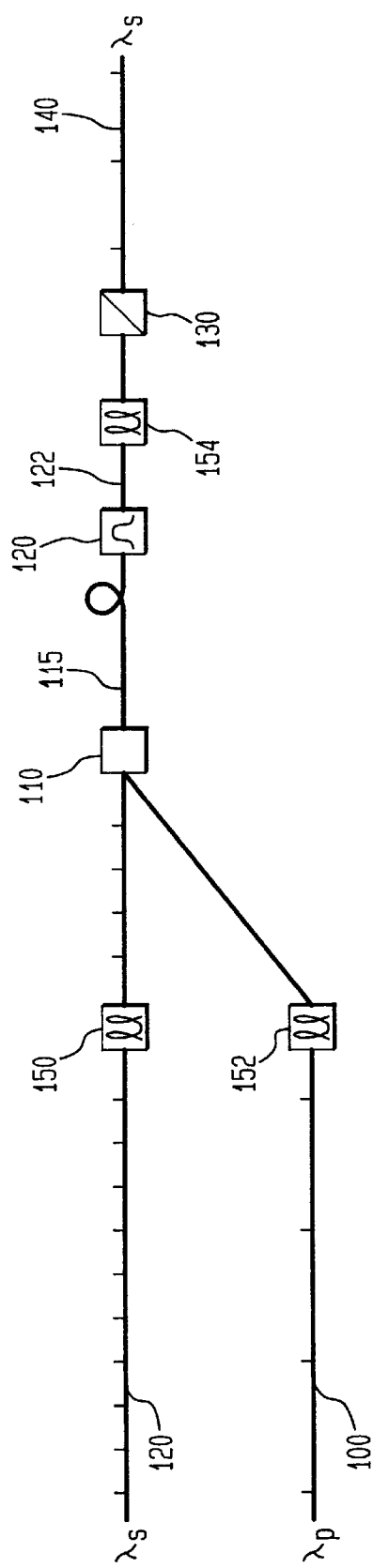
FIG. 1 illustrates a prior art optical transmission system utilizing a Kerr effect demultiplexer.
Figure 2:
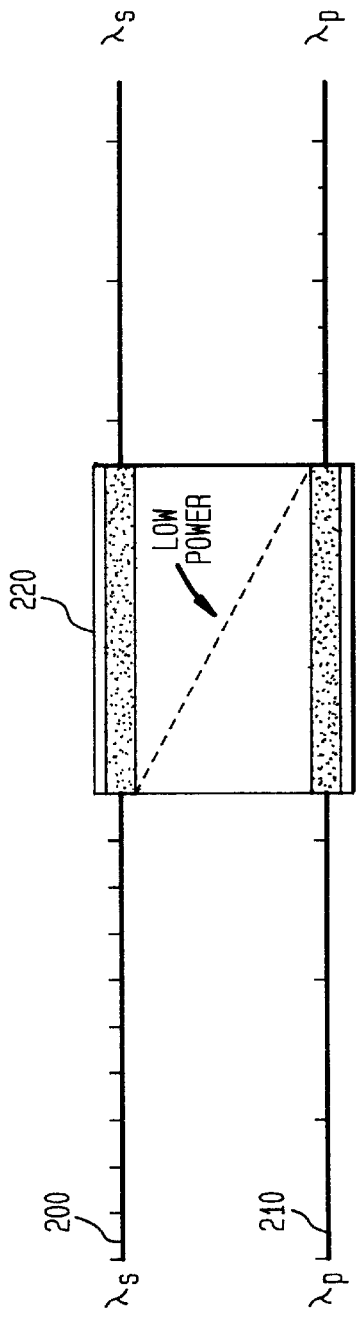
FIG. 2 illustrates a prior art optical transmission system utilizing a nonlinear directional coupler demultiplexer.
Figure 3:
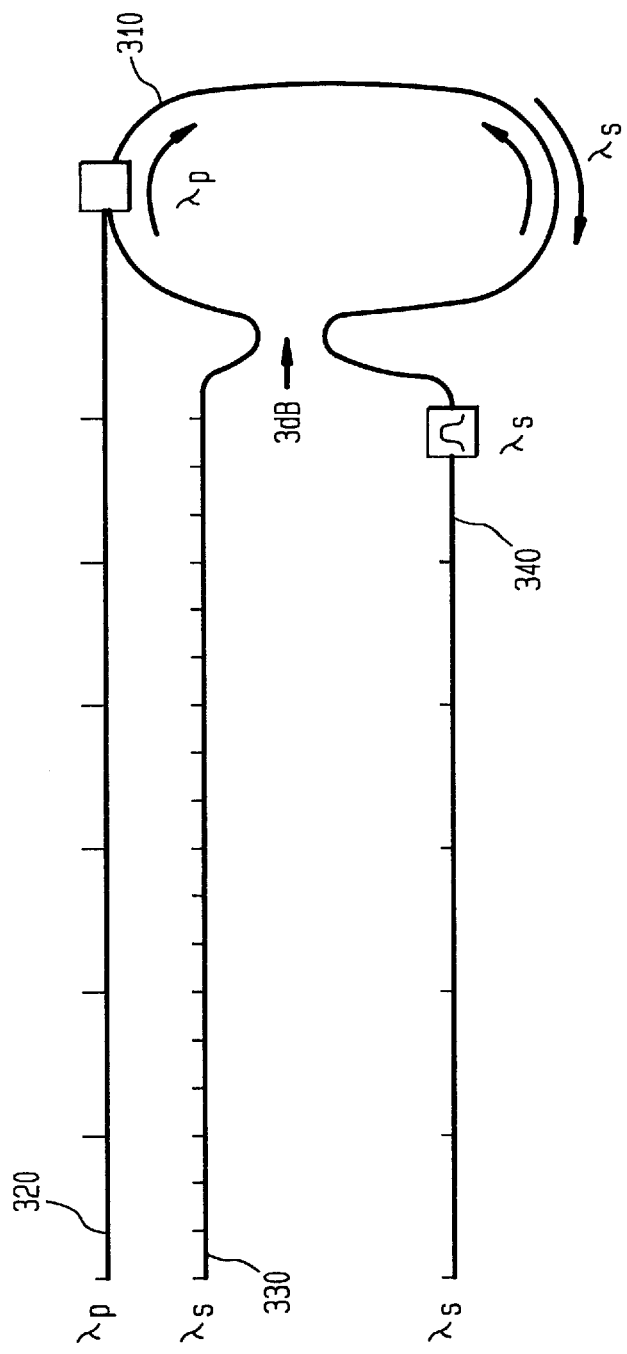
FIG. 3 illustrates a prior art optical transmission system utilizing a nonlinear loop mirror demultiplexer.

An optical system 500 for transmitting a time division multiplexed optical signal and for optically demultiplexing the signal in accordance with the present invention is shown in FIG. 5. A signal source 510 (or multiple signal sources) generates a multiplexed optical signal which is transmitted via an optical signal path 512. The optical signal path 512 may advantageously be an optical fiber. Assume for the purpose of this description that the multiplexed optical signal is transmitted at a wavelength of $\lambda_s$ and that the signal is multiplexed such that every third signal pulse corresponds to a signal for a particular user or destination. For example, the signal pulses indicated by an arrow in FIG. 5 are the signal pulses for a particular user or destination. Thus, it is desired to demultiplex the multiplexed optical signal in order to extract this particular signal. In accordance with the invention, an optical pump pulse generator 520 generates optical pump pulses at a wavelength of $\lambda_p$ which are synchronized in time with the signal pulses for which extraction is desired. These optical pump pulses generated by optical pulse generator 520 are transmitted via optical signal path 522. Thus, in the example shown in FIG. 5, the optical pump pulses are synchronized with every third signal pulse.

Optical signal path 512 is coupled with optical signal path 522 using a wavelength multiplexing coupler 526 such that the multiplexed signal is combined with the synchronized pump pulses to generate a combined signal over optical signal path 530. The result of the combining of the multiplexed signal with the synchronized pump pulses is that the signal pulses of the multiplexed signal which are synchronized with the pump pulses get amplified in the generated combined signal. This amplification is a result of Raman gain.

The Raman gain effect is an interaction between light and molecular vibrations (in this case of Silicon and oxygen ions in the glass) which is used to make an optically-pumped optical amplifier. In the Raman amplifier the signal is amplified with exponential gain:

$$P_s(\text{out}) = P_s(\text{in})e^{\frac{gP_{pump}L}{A_{eff}}}$$

where $P_s$ is the signal power, $P_{pump}$ is the pump power, g is a gain coefficient expressing the strength of the Raman interaction between the light and the molecular vibrations, L is fiber length and $A_{eff}$ is the effective core area. In typical fibers, a factor of 10 amplification would require 1 W of pump power and a fiber 1 km long. This power length product of about 1 kW-m is similar to the power-length product for the nonlinear-index fiber demultiplexers. For further information on Raman gain see, U.S. Pat. No. 3,705,992 which is incorporated herein by reference. Also, see R. H. Stolen, *Fiber Raman Lasers*, Fiber and Integrated Optics, Vol. 3, No. 1 (1980) which is incorporated herein by reference.

Returning now to FIG. 5, the signal pulses of the multiplexed signal which are not synchronized with the pump pulses do not get amplified in the generated combined signal. It is noted that maximum Raman gain in a fiber requires a strong pump at a wavelength about 100 nm shorter than the wavelength of the signal being amplified. Thus, in the example shown in FIG. 5, the wavelength of the pump signal $\lambda_p$ would be approximately 100 nm shorter than the wavelength of the multiplexed signal $\lambda_s$.

The combined signal is passed through bandpass filter 532 to filter out the pump power at wavelength $\lambda_p$. The combined signal of amplified and non-amplified signal pulses is detected and then passed through a threshold detector 540 which filters out optical pulses below a certain intensity threshold. The optical threshold detector 540 is configured such that optical signal pulses are converted into corresponding electrical pulses, but only those electrical pulses which are above a certain threshold get passed through. Thus, only the signal pulses which were amplified by the pump pulses result in electrical signal pulses being transmitted from the output of the optical threshold detector 540. The signal pulses which were not amplified by the pump pulses do not result in electrical signals being transmitted by the optical threshold detector 540. The result is that signals in non-amplified time slots fall below the decision threshold after the detector. Thus, every third signal pulse is passed through the optical threshold detector 540 and the multiplexed signal has been demultiplexed.

Along with the nonlinear index fiber demultiplexers, the demultiplexer in accordance with the invention shares the need for a sequence of short optical pulses which can be synchronized with pulses in the time slot to be separated out in demultiplexing. In contrast to the nonlinear index demultiplexers, the demultiplexer in accordance with the invention utilizes Raman gain rather than the nonlinear refractive index.

The demultiplexer in accordance with the invention has advantages over the nonlinear index demultiplexers. First, no special polarization control is required. This is not because the amplifier is insensitive to polarizations but rather because typical fibers scramble the state of polarization of both the pump signal and the multiplexed signal so the net amplification is insensitive to the input state of polarization of either the pump signal or the multiplexed signal. Second, active stabilization is not necessary as was required in the Kerr or nonlinear directional coupler demultiplexers. Thus demultiplexers in accordance with the invention can use long fibers. This reduces the necessary power of the pump pulses. Third, phase matching is not required as for the four-wave mixing demultiplexer.

There are certain disadvantage of the demultiplexer in accordance with the invention. In a long fiber with copropagating pulses it is necessary to match the group velocities of the pump signal and multiplexed signal pulses so that the pulses stay together along the entire amplification length. It is well known that this can be accomplished by designing the Raman amplifier fiber (e.g. signal path 530 in FIG. 5) so that the zero-dispersion wavelength lies between the pump signal and multiplexed signal wavelengths. This could also be a problem with the four-wave mixing and loop-mirror demultiplexers although it would be less severe because the wavelengths of the multiplexed signal and the demultiplexing pulses are closer together than in the Raman amplifier. The fiber lengths of the Kerr and directional coupler demultiplexers would probably be short enough that group velocity matching would not be a serious problem but this comes at the expense of higher power requirements.

It is noted that some walk-off between the pump pulses and multiplexed signal will provide an increase in the timing acceptance window for incoming pulses. This would allow for some jitter in the timing of the incoming pulse stream at the expense of requiring higher pump power.

One could envision two limits for a demultiplexer in accordance with the invention. One would have high gain and large separation between amplified pump signals and multiplexed signals. Better signal to noise would be obtained with more amplification and there may be applications where it would be desirable to go to the limit to get the best performance possible despite the extra expense. The other limit would have lower gain and require a setting of the detection threshold well above the midpoint. This may however be useful in systems where low cost overrides performance requirements. For example, in an environment with little noise (e.g. local area network) it may be desirable to operate with amplification by only a factor of two.

For example purposes, the following parameters may be used in an optical signal embodiment in accordance with the present invention. The pump and signal wavelengths would be close to 1.47 µm and 1.55 µm, respectively. The fiber would be a dispersion-shifted fiber with its zero-dispersion wavelength located approximately midway between 1.47 µm and 1.55 µm. The goal is to match the group velocities of pump and signal. Since the curve of group velocity vs. wavelength is not quite symmetrical, the zero-dispersion wavelength won't be quite dead center in wavelength. For a Raman amplifier fiber 1 km long a pump pulses with peak power 1 W will give 10X amplification of the signal. Less amplification runs into potential errors from fluctuations and more amplification, although desirable, may not be worth the extra expense in pump power and fiber precision. The fiber length is set by the accuracy to which the desired zero-dispersion wavelength can be maintained. A deviation of 1 nm in zero-dispersion wavelength is reasonable and for 10 ps optical pulses sets a pump-signal pulse walkoff limit to the fiber length of about 1 km.

It is noted that the invention has been described in the context of bit interleaved time division multiplexing wherein each multiplexed pulse is separated out for a different user or destination. However, the principles of the present invention are applicable in a system in which there are larger time slots and multiple sequential pulses are to be separated out for each user or destination. For example, it is possible to separate out the signal such that four sequential pulses are extracted for each user or destination. In addition, the number of sequential pulses extracted for each user or destination may be variable. Thus, the pump signal may be aperiodic and such pump signals may be implemented using a continuous wave pump with modulator.

It is further noted that the principles of the present invention are applicable where the signals are RZ (return to zero) type signals as well as where the signals are NRZ (non-return to zero) type signals.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

I claim:

1. A method for transmitting information over an optical transmission system comprising the steps of:

transmitting a time division multiplexed optical signal over a first optical signal path at a first wavelength;

transmitting synchronized optical pump pulses over a second optical signal path at a second wavelength;

combining said time division multiplexed optical signal and said synchronized optical pump pulses to generate a combined optical signal wherein portions of said time division multiplexed optical signal which are synchronized with said optical pump pulses are amplified; and providing said combined optical signal to an optical threshold detector to generate a demultiplexed signal.

2. The method of claim 1 wherein said second wavelength is approximately 100 nm less than said first wavelength.

3. The method of claim 1 wherein said first and second optical signal paths are fiber optic signal paths.

4. The method of claim 1 wherein said amplification is a result of Raman gain.

5. The method of claim 1 wherein said first wavelength is approximately 1.55 μm and said second wavelength is approximately 1.47 μm.

6. A method for transmitting information comprising:

transmitting a time division multiplexed optical signal having a first wavelength over an optical signal path;

amplifying portions of said time division multiplexed optical signal using synchronized optical pump pulses at a second wavelength to generate a combined optical signal; and providing said combined optical signal to an optical threshold detector wherein only said amplified portions of said time division multiplexed optical signal generate signals through said optical threshold detector.

7. The method of claim 6 wherein said second wavelength is approximately 100 nm less than said first wavelength.

8. The method of claim 6 wherein said optical signal path is a fiber optic signal path.

9. The method of claim 6 wherein said amplification is a result of Raman gain.

10. The method of claim 6 wherein said first wavelength is approximately 1.55 μm and said second wavelength is approximately 1.47 μm.

11. A method for demultiplexing a time division multiplexed optical signal comprising the steps of:

providing synchronized optical pump pulses;

combining said synchronized optical pump pulses with the time division multiplexed optical signal to generate a combined signal wherein portions of said time division multiplexed optical signal which are synchronized with said optical pump pulses are amplified; and providing said combined signal to an optical threshold detector such that only said amplified portions of said combined signal generate signals that are transmitted through said optical threshold detector.

12. The method of claim 11 wherein said amplification is a result of Raman gain.

13. An optical signal transmission system comprising:

a first optical signal path transmitting a time division multiplexed optical signal at a first wavelength;

a second optical signal path transmitting synchronized optical pump pulses at a second wavelength;

a coupler for combining said first optical signal path and said second optical signal path such that portions of said time division multiplexed optical signal which are synchronized with said optical pump pulses are amplified thereby generating a combined optical signal for transmission over a third optical signal path; and an optical threshold detector coupled to said third optical signal path configured to transmit signals corresponding to said amplified portions of said combined optical signal.

14. The system of claim 13 wherein said second wavelength is approximately 100 nm less than said first wavelength.

15. The system of claim 13 wherein said first and second optical signal paths are fiber optic signal paths.

16. The system of claim 13 wherein said amplification is a result of Raman gain.

17. An apparatus for demultiplexing a time division multiplexed optical signal comprising:

an optical pulse generator for generating synchronized optical pump pulses;

a coupler for combining said synchronized optical pump pulses with said time division multiplexed optical signal to generate a combined signal wherein portions of said time division multiplexed optical signal which are synchronized with said optical pump pulses are amplified; and an optical threshold detector for receiving said combined signal and for transmitting signals corresponding only to said amplified portions of said combined signal.

18. The apparatus of claim 17 wherein said amplification is a result of Raman gain.

* * * * *